United States Patent [19]
Tokita et al.

[11] Patent Number: 6,040,024
[45] Date of Patent: Mar. 21, 2000

[54] LAMINATED FILM, METHOD FOR PRODUCTION THEREOF, AND BAG AND PACKAGE USING THE LAMINATED FILM

[75] Inventors: Yoshiaki Tokita, Urayasu; Takahiro Takagi, Saitama-ken, both of Japan

[73] Assignee: Kyodo Shiko Co., Ltd., Tokyo, Japan

[21] Appl. No.: 09/025,868

[22] Filed: Feb. 19, 1998

[30] Foreign Application Priority Data

Mar. 26, 1997 [JP] Japan .................................. 9-091480

[51] Int. Cl.⁷ .............................. B32B 7/06; B32B 27/00; B32B 27/08; B32B 27/32; B65D 65/40
[52] U.S. Cl. ...................... 428/35.2; 428/35.4; 428/35.9; 428/36.6; 428/518; 428/520
[58] Field of Search .................................. 428/36.6, 462, 428/483, 501, 35.3, 35.4, 35.7, 35.9, 518, 520, 476.3, 346, 347, 35.2

[56] References Cited

U.S. PATENT DOCUMENTS

| | | | |
|---|---|---|---|
| 3,114,643 | 12/1963 | Boston et al. | 99/171 |
| 3,272,424 | 9/1966 | Rodkey | 229/66 |

(List continued on next page.)

FOREIGN PATENT DOCUMENTS

| | | |
|---|---|---|
| 77062/91 | 5/1991 | Australia . |
| 1 0 011 502 | 5/1980 | European Pat. Off. . |
| 1 0 190 776 | 8/1986 | European Pat. Off. . |
| 0 328 245 | 8/1989 | European Pat. Off. . |
| 0 518 689 A1 | 12/1992 | European Pat. Off. . |
| 1-0 608 801 | 8/1994 | European Pat. Off. . |
| 2-0 644 032 | 3/1995 | European Pat. Off. . |
| 2-0 769 369 | 4/1997 | European Pat. Off. . |
| 1.600.060 | 8/1970 | France . |
| 2 585 248 | 1/1987 | France . |
| 54-97193 | 8/1979 | Japan . |
| 56-72006 | 6/1981 | Japan . |
| 60-32273 U | 3/1985 | Japan . |
| 226569 | 9/1989 | Japan . |
| 2-163149 | 6/1990 | Japan . |
| 242748 | 9/1990 | Japan . |
| 4-57989 | 2/1992 | Japan . |
| 5 140350 | 6/1993 | Japan . |
| 6-72469 | 3/1994 | Japan . |
| 6-127593 | 5/1994 | Japan . |
| 6134942 | 5/1994 | Japan . |
| 6-155690 | 6/1994 | Japan . |
| 6-219492 | 8/1994 | Japan . |
| 6-286082 | 10/1994 | Japan . |
| 6328608 | 11/1994 | Japan . |
| 7-2272 | 1/1995 | Japan . |
| 7-118407 | 5/1995 | Japan . |
| 9066261 | 3/1997 | Japan . |
| 9-164623 | 6/1997 | Japan . |
| 9-221147 | 8/1997 | Japan . |
| 922317 | 8/1963 | United Kingdom . |
| 1 054 808 | 1/1967 | United Kingdom . |
| 1-054-808 | 1/1967 | United Kingdom . |
| 2 150 908 | 7/1985 | United Kingdom . |
| 2 193 925 | 2/1988 | United Kingdom . |
| 2 244 258 | 11/1991 | United Kingdom . |
| WO 94/29104 | 12/1994 | WIPO . |
| WO 96/15903 | 5/1996 | WIPO . |

Primary Examiner—Ellis Robinson
Assistant Examiner—John J. Figueroa
Attorney, Agent, or Firm—Oliff & Berridge, PLC

[57] ABSTRACT

A laminated film includes an outer-layer-film, a water-soluble film, and an intermediate layer interposed between the outer-layer-film and the water-soluble film. The intermediate layer contains high-pressure polyethylene oxidized to a prescribed degree on a surface thereof contiguous to the water-soluble film. The outer-layer-film and the intermediate layer adhere fast to each other. The intermediate layer and the water-soluble film directly contact each other and adhere so weakly to each other as to be peelable. The water-soluble film includes a water-soluble substrative film and water-soluble anchor coating agent distributed on a surface of the water-soluble substrative film contiguous to said intermediate layer.

13 Claims, 7 Drawing Sheets

U.S. PATENT DOCUMENTS

| | | | |
|---|---|---|---|
| 3,419,137 | 12/1968 | Walck, III | 206/63.2 |
| 3,454,210 | 7/1969 | Spiegel et al. | 229/43 |
| 3,768,725 | 10/1973 | Pilaro | 229/66 |
| 4,279,344 | 7/1981 | Holloway, Jr. | 206/631 |
| 4,289,815 | 9/1981 | Lee | 428/35 |
| 4,365,716 | 12/1982 | Watt | 206/632 |
| 4,416,791 | 11/1983 | Haq | 252/90 |
| 4,681,228 | 7/1987 | Kerry et al. | 206/484 |
| 4,785,937 | 11/1988 | Tamezawa et al. | 206/484 |
| 4,787,517 | 11/1988 | Martin | 206/610 |
| 4,844,828 | 7/1989 | Aoki | 252/90 |
| 4,923,309 | 5/1990 | VanErden | 383/5 |
| 5,005,695 | 4/1991 | Tennefos et al. | 206/69 |
| 5,015,513 | 5/1991 | Newbold et sl. | 428/35.5 |
| 5,080,226 | 1/1992 | Hodakowski et al. | 206/205 |
| 5,230,944 | 7/1993 | Beer et al. | 428/195 |
| 5,253,754 | 10/1993 | Soodak | 206/438 |
| 5,279,421 | 1/1994 | Gouge et al. | 206/484 |
| 5,330,047 | 7/1994 | Gouge et al. | 206/205 |
| 5,341,922 | 8/1994 | Cerwin et al. | 206/63.3 |
| 5,362,532 | 11/1994 | Famili et al. | 428/36.6 |
| 5,429,874 | 7/1995 | VanPutte | 428/522 |
| 5,441,805 | 8/1995 | Kwok | 428/339 |
| 5,456,928 | 10/1995 | Hustad et al. | 426/87 |
| 5,487,940 | 1/1996 | Bianchini et al. | 428/349 |
| 5,487,947 | 1/1996 | Kakishita et al. | 428/424.4 |
| 5,614,318 | 3/1997 | Hayashi | 428/353 |
| 5,691,015 | 11/1997 | Tsukamoto et al. | 428/35.2 |
| 5,827,586 | 10/1998 | Yamashita et al. | 428/36.6 |

LAMINATED FILM, METHOD FOR PRODUCTION THEREOF, AND BAG AND PACKAGE USING THE LAMINATED FILM

CROSS-REFERENCE TO RELATED APPLICATION

The present invention is related to U.S. patent application Ser. No. 08/969,792 entitled "LAMINATED FILM, METHOD FOR PRODUCTION THEREOF, BAG AND PACKAGE USING THE LAMINATED FILM, AND METHOD FOR SEPARATION THEREOF" filed on Nov. 13, 1997, the disclosure of which is incorporated herein by reference.

BACKGROUND OF THE INVENTION

The present invention relates to a laminated film, a method for the production thereof, and a bag and a package both using the laminated film.

Heretofore, for the purpose of accommodating agricultural chemicals and other various commodities, bags which are made of a laminated film having the component layers thereof joined by lamination so strongly as to be impossible to peel have been used. The conventional laminated film has for the innermost layer thereof a film (such as, for example, LDPE (high-pressure low-density polyethylene) film) that is thermally adhesive (namely heat-sealable) to itself. A commodity is placed in a hermetically sealed bag produced by superposing this laminated film so that the thermally adhesive film is positioned inside, and heat-sealing the prescribed portions of the superposed laminated film so that the parts of the thermally adhesive film facing to each other at the prescribed portions are fused to each other.

As means for enabling commodities to be contained in hermetically sealed bags that are made of the laminated film mentioned above, the two methods called "bag supplying method" and "automatic packaging method" are known. The bag supplying method comprises a manufacturer of bags initially producing bags open in one side from the laminate film mentioned above and a manufacturer of commodities then receiving the supply of these bags, filling the bags with their commodities via the openings thereof, and thereafter occluding the openings of the bags by heat-sealing. The automatic packaging method comprises a manufacturer, for example, of commodities forwarding the laminated film mentioned above through the sequential steps of the process of production of bags such as, for example, superposing the laminated film upon itself, heat-sealing the prescribed portions of the superposed laminated film, and filling the formed bags with their commodities, and finally obtaining hermetically sealed bags accommodating the commodities therein. Irrespectively of the choice between these two methods, automatic machines adapted to automate the steps of manufacture mentioned above have been finding extensive adoption by the manufacturers of commodities. In the case of the bag supplying method, for example, such automatic machines as are capable of automatically filling the bags opened in one side with the commodities and then automatically heat-sealing the openings of the filled bags are used. In the case of the automatic packaging method, such automatic machines as are capable of automating the process of automatic packaging mentioned above are used.

Generally, even when the commodity to be contained happens to be a powdery agricultural chemicals (which is generally diluted with water prior to use), for example, it is directly contained in the bag that is made of the conventional laminated film mentioned above. When a user of the agricultural chemicals opens the bag, the powdery agricultural chemicals is drifted up through the opened side of the bag possibly to be inhaled by the user or suffered to impinge on the user's hands, with the result that the powder will do harm to the user's system. When the user transfers the powdery agricultural chemicals from the bag into a tank for the purpose of diluting it with water, the powdery agricultural chemicals is likewise drifted up and suffered to do harm to the user's system. Even after the agricultural chemicals has been extracted from the bag, the remnant thereof adheres to the inner wall of the bag. If the bag in this condition is discarded among the household rubbish, therefore, it will form a cause for environmental pollution.

For the purpose of safeguarding the environment against this danger, therefore, the practice of containing a given powdery agricultural chemicals in a bag made of a water-soluble film, hermetically sealing this bag, further containing the bag of the water-soluble film accommodating the agricultural chemicals in a bag formed of the conventional laminated film mentioned above, and hermetically sealing the outer bag has been in vogue in recent years. In this case, the bag of the water-soluble film serves as an inner bag and the bag of the conventional laminated film as an outer bag. The reason for using the outer bag in this manner is that the water-soluble film succumbs readily to the degeneration by the ambient condition and possesses no sufficient strength.

When the inner bag and the outer bag are used as described above, the outer bag can be opened without entailing the danger of drifting up the agricultural chemicals and the inner bag containing the agricultural chemicals can be directly placed in a tank and diluted with the water accommodated in the tank (because the inner bag of the water-soluble film dissolves on contact with water), with the result that the composite bag will ensure perfect ease of handling because the agricultural chemicals accommodated therein no longer has the possibility of doing harm to the user's system or jeopardizing the safety of the environment. After the agricultural chemicals has been extracted from the outer bag, absolutely no remnant thereof is adhering to the inner wall of the outer bag. When the outer bag is discarded as it is among household rubbish, therefore, it entails absolutely no problem.

The foregoing remarks hold good not only for the powdery agricultural chemicals mentioned above but also for a granular or liquid agricultural chemicals and other various commodities.

The conventional practice of using both an inner bag and an outer bag, however, incurs a huge cost. This conventional practice of using both an inner bag and an outer bag, for example, requires inner bags to be separately produced and necessitates an extra cost for this production. The operation of placing the inner bag accommodating a given commodity in the outer bag, for example, necessitates the use of new devices at an extra cost of equipment because this operation does not permit use of the aforementioned existing automatic machines which fit the bag supplying method and the automatic packaging method mentioned above.

The idea of preparing a laminated film having an outer-layer-film and a water-soluble film weakly joined to each other in a peelable manner through the adhesive of weak adhesive force (adhesive strength or peel strength) and, in accordance with the conventional bag supplying method or automatic packaging method mentioned above, superposing this laminated film so that the water-soluble film is positioned inside, heat-sealing the prescribed portions of the superposed laminated film so that the parts of the water-soluble film facing to each other a the prescribed portions are fused to each other, thereby forming a hermetically sealed bag, and containing a commodity in this bag is conceivable in the circumstance. Incidentally, the water-soluble film is generally thermally adhesive to itself.

According to this method employing the adhesive, the bag made of the laminated film mentioned above has a double-wall structure consisting of an outer-layer-film functioning as an outer bag and a water-soluble film functioning as an inner bag. The user of the commodity contained in this bag, similarly to the aforementioned composite bag consisting of an inner bag and an outer bag, is only required to peel (or separate) the outer-layer-film to obtain the commodity as contained in the inner bag of the water-soluble film without entailing the danger of drifting up the commodity such as, for example, agricultural chemicals. He is then required to place the inner bag still accommodating the commodity in the tank and dilute it with the water accommodated in the tank (because the bag made of the water-soluble film dissolves on contact with water), with the result that the user will enjoy perfect ease of handling because the commodity accommodated therein no longer has the possibility of doing harm to his system or jeopardizing the safety of the environment.

Since the laminated film mentioned above can be handled during the insertion of a given commodity therein in the same manner as the conventional laminated film, the existing automatic machines and other devices can be used in their unmodified form. The bag incurs no noticeable addition to the cost of production because it obviates the necessity of separately producing inner bags unlike the aforementioned composite bag consisting of an inner bag and an outer bag.

In the method resorting to an adhesive agent, the adhesive agent is not easily obtained as vested with ideal properties for the adhesion contemplated by the method. The product of this method, therefore, has the possibility that the properties of the adhesive and the water-soluble film will vary with the elapse of time because of the reaction between the components of the adhesive and the water-soluble film. The possibility that the outer-layer-film will not be easily peeled off from water-soluble film when the user seeks to use the commodity accommodated in the bag, the outer-layer-film will peel from the water-soluble film before the bag reaches the user, the water-soluble film will sustain pinholes therein, or the water-soluble film will suffer degradation of the water-solubility thereof, therefore, is undeniable. Further, the possibility exists that part of the adhesive will remain on the water-soluble film and go to impair the solubility of the water-soluble film after the outer-layer-film has been peeled from the water-soluble film and the components of the adhesive will react with the components of the commodity such as, for example, agricultural chemicals in the tank accommodating water and degenerate the commodity after the water-soluble film has been dissolved in the water during the use of the commodity.

In the circumstance, the present inventors, after a study, have developed a laminated film having: an outer-layer-film including one or more layers; a water-soluble film; and an intermediate layer interposed between the outer-layer-film and the water-soluble film, the intermediate layer containing high-pressure polyethylene oxidized to a prescribed degree at least on a surface thereof contiguous to the water-soluble film. The outer-layer-film and the intermediate layer adhere fast to each other. The intermediate layer and the water-soluble film directly contact each other and adhere so weakly to each other as to be peelable.

Further, the present inventors have developed a package using this laminated film. This package has a hermetically sealed bag made of the laminated film and a prescribed commodity placed in the bag. The laminated film is superposed so that the water-soluble film is positioned inside. Prescribed portions of the superposed laminated film are heat-sealed so that the parts of the water-soluble film facing to each other at the prescribed portions are fused to each other.

Here, the inferable basic principle of the weak adhesion in the above-mentioned laminated film developed by the present inventors will be described below.

In the light of the conventional technical common sense prevalent in the field of laminated films, it is thought that direct adhesion (adhesion in the absence of an adhesive) between high-pressure polyethylene and a water-soluble film is difficult to attain. Absolutely no case of effecting this form of adhesion has ever been reported to date in the field of laminated films. The techniques of lamination include the extrusion lamination in which a plurality of films directly are adhered to each other without using an adhesive, besides the adhesive lamination. However, in the field of techniques of lamination, the extrusion lamination has been established as a technique of attaining fast adhesion of a plurality of films into an integral composite. Absolutely no idea has been conceived of using the extrusion lamination for attaining so weak adhesion of a plurality of films as permits the joined films to be separated by peeling. Absolutely no case of using the extrusion lamination for weak adhesion of a plurality of films has ever been reported. Particularly, absolutely no case of using the extrusion lamination for direct adhesion between a high-pressure polyethylene and a water-soluble film has ever been known.

The high-pressure polyethylene has a repeating unit represented by the following chemical formula (1), having a hydrogen bond, nonpolar in behavior, for the terminal group thereof.

 (1)

On the other hand, a water-soluble film has the polar group of the form of hydroxyl—OH— for the terminal group thereof. It is, therefore, thought that the direct adhesion (through no medium such as an adhesive) of the two members under discussion is difficult.

The present inventors, after a study, have found that when the surface of a film including high-pressure polyethylene therein is oxidized, union is attained with adhesive force (peeling force) in accordance with to the extent of the oxidation between high-pressure polyethylene and a water-soluble film.

Specifically, when the high-pressure polyethylene is oxidized, the part of the high-pressure polyethylene that responds to the oxidation becomes a composition represented by the following chemical formula (2).

 (2)

On the other hand, the substance of the water-soluble film such as, for example, polyvinyl alcohol has a repeating unit represented by the following chemical formula (3) and a chemical structure represented by the following chemical formula (4).

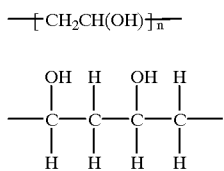

(3)

(4)

It is, therefore, made possible to generate linkage of relatively weak binding strength between the carbonyl group of the oxidized high-pressure polyethylene and the hydroxyl group of the polyvinyl alcohol as represented by the following chemical formula (5).

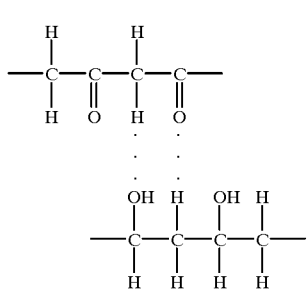

(5)

This linkage generates adhesive force between the film of the oxidized high-pressure polyethylene and the film of the polyvinyl alcohol and allows direct adhesion of the two films. Since the amount of the carbonyl group in the oxidized high-pressure polyethylene varies with the degree of the oxidation, the adhesive force between the film of the oxidized high-pressure polyethylene and the film of the polyvinyl alcohol can be adjusted by the extent to which the high-pressure polyethylene is oxidized. Since other water-soluble films likewise have a hydroxyl group, the principle described above applies not only to the film of polyvinyl alcohol but also to the other water-soluble films.

It is thought based on the principle described above that in the above-mentioned laminated film developed by the present inventors, the water-soluble film and the intermediate layer containing high-pressure polyethylene oxidized to a prescribed degree at least on the surface thereof contiguous to the water-soluble film directly contact each other and can adhere so weakly to each other as to permit the joined films to be separated by peeling.

In the above-mentioned laminated film developed by the present inventors, the outer-layer-film and the intermediate layer adhere fast to each other, and the intermediate layer and the water-soluble film directly contact each other and adhere so weakly to each other as to peelable. The bag of the above-mentioned package using the laminated film, therefore, has a double-wall structure consisting of the outer-layer-film and the intermediate layer (hereinafter collectively referred to as "outer bag film" for the sake of explanation) which adhere fast to each other and act as an outer bag and the water-soluble film which acts as an inner bag. In this structure, the outer bag film and the water-soluble film adhere so weakly to each other as to be peelable. The user of the commodity in the package, therefore, is only required to peel the outer bag film in gaining access to the commodity accommodated in the inner bag of the water-soluble film similarly to the aforementioned composite package consisting of an inner bag and an outer bag. When the commodity happens to be agricultural chemicals, the outer bag does not suffer the commodity to drift up when it is peeled and the inner bag still accommodating the commodity can be placed in a tank and diluted with the water placed in the tank (because the inner bag made of the water-soluble film dissolves on contact with water). This package, therefore, ensures perfect ease of handling because the commodity accommodated therein no longer has the possibility of doing harm to the user's system or jeopardizing the safety.

Since the above-mentioned laminated film developed by the present inventors can be handled during the insertion of the commodity therein in the same manner as the conventional laminated film, the existing automatic machines and other devices can be used in their unmodified form. The bag incurs no noticeable addition to the cost of production because it obviates the necessity of separately producing inner bags unlike the aforementioned composite bag consisting of an inner bag and an outer bag.

In the above-mentioned laminated film developed by the present inventors, only linkage occurs between the carbonyl group of the oxidized high-pressure polyethylene and the hydroxyl group of the water-soluble film as described above. There is no possibility that the high-pressure polyethylene and the water-soluble film will induce other chemical reactions with the elapse of time. Unlike the laminated film of the type using an adhesive as mentioned above, the present laminated film can obtain stable adhesive force with the elapse of time between the intermediate layer and the water-soluble film due to a sparing possibility of the change of the properties of the high-pressure polyethylene and the water-soluble film with the elapse of time. As a result, there is no possibility that the outer bag film will not be easily peeled off the water-soluble film when the user seeks to use the commodity accommodated in the bag. There is no possibility that the outer bag film will be peeled off the water-soluble film before the bag reaches the user. There is no possibility that the water-soluble film will have pinholes therein. There is no possibility that the water-soluble film will suffer degradation of the water-solubility thereof. Further, since the adhesive force between the outer bag film and the water-soluble film (namely, between the intermediate layer and the water-soluble film) originates in the union of relatively weak binding strength produced between the carbonyl group of the oxidized high-pressure polyethylene and the hydroxyl group of the polyvinyl alcohol as already described, there is no possibility that the components of the intermediate layer remain on the water-soluble film after peeling the outer bag film. As a result, there is no possibility that, after the water-soluble film has been dissolved in water in preparation for use of the commodity such as the agricultural chemicals accommodated therein, the components of the intermediate layer will react with the components of the commodity such as the agricultural chemicals accommodated in the bag to deteriorate the commodity. Since the intermediate layer, unlike the adhesive, can be formed so as to have a relatively large thickness, the intermediate layer additionally functions as a protector against a mechanical shock. In the case of using adhesive, sufficient moisture-proofing ability can not be obtained since the adhesive produces pinholes due to a coating. The intermediate layer functions so as to enhance the moistureproofing ability since intermediate layer does not produce such pinholes thereof.

As described above, the laminated film and the package using the laminated film, which have been developed by the present inventors, are greatly excellent. After further study, however, it has been found that if the water-soluble film is made of only a water-soluble substrative film, there are some cases where the state of adhesion based on the week adhesion between the intermediate layer and the water-soluble film is undesirable at the heat-sealed portions of the bag of the package according to the sort of the water-soluble substrative film. That is, it has been found that there are some cases where when the heat-sealed portion of the bag of the package is greatly bent one or two times in such a manner that a crease is generated from the inside area of the heat-sealed portion to the outer edge of the bag, a gap is made between the intermediate layer and the water-soluble film at the outer edge portion of the crease. Such a situation may occur in transport of the package. Such a situation is undesirable since the gap may become a beginning for peeling the outer bag film which may induce unintentional peeling of the outer bag film.

SUMMARY OF THE INVENTION

The present invention has been produced in view of the circumstances mentioned above. The present invention has an object of providing a laminated film capable of producing by the use of existing facilities a bag having a double-wall structure essentially consisting of an outer bag and an inner bag made of a water-soluble film excelling in the peeling property of the outer bag, and capable of setting the state of adhesion based on the week adhesion between the intermediate layer and the water-soluble film at the heat-sealed portions of the bag to prescribed state; a method for producing the laminated film; and a bag and a package both using the laminated film.

After further study, the present inventors have found that when the water-soluble film is made of not only a water-soluble substrative film such as polyvinyl alcohol film but also water-soluble anchor coating agent distributed on a surface of the water-soluble substrative film contiguous to the intermediate layer in the above-mentioned laminated film developed by the present inventors, the state of adhesion based on the week adhesion between the intermediate layer and the water-soluble film at the heat-sealed portions of the bag can be suitably adjusted, and thereby even if the heat-sealed portion is greatly bent in such a manner that a crease is generated from the inside area of the heat-sealed portion to the outer edge of the bag, it is hard to make a gap between the intermediate layer and the water-soluble film at the outer edge portion of the crease. Since the water-soluble anchor coating agent has a water-solubility, there is no possibility of impairing the solubility of the water-soluble film. The present invention has been produced based on the knowledge as mentioned above.

A laminated film according to a first aspect of the present invention comprises: an outer-layer-film including one or more layers; a water-soluble film; and an intermediate layer interposed between the outer-layer-film and the water-soluble film, the intermediate layer containing high-pressure polyethylene oxidized to a prescribed degree at least on a surface thereof contiguous to the water-soluble film. The outer-layer-film and the intermediate layer adhere fast to each other. The intermediate layer and the water-soluble film directly contact each other and adhere so weakly to each other as to be peelable. The water-soluble film includes a water-soluble substrative film and water-soluble anchor coating agent distributed on a surface of the water-soluble substrative film contiguous to the intermediate layer.

The term "fast adhesion" as used herein means the union of two faces with such adhesive force as to render their peeling substantially difficult and the term "weak adhesion" means the union of two faces with such adhesive force as is weaker than that of the fast adhesion mentioned above and is capable of allowing the joined faces to peel.

In the first aspect, the intermediate layer may contain only high-pressure polyethylene, and the intermediate layer may contain material such as an ethylene • α-olefin copolymer elastomer mixed with high-pressure polyethylene.

For the layer of the outer-layer-film that approximates most to the intermediate layer, for example, it suffices to employ a layer to which the high-pressure polyethylene can be joined by thermal adhesion (that is, a layer to which the high-pressure polyethylene in a molten state is capable of adhering fast). As a result, the fast adhesion can be realized between the outer-layer-film and the intermediate layer.

For the outer-layer-film, various outer-layer-films which have been used in the conventional laminated films mentioned above may be employed. More specifically for the outer-layer-film, (1) simple polyester film, (2) simple paper, (3) a composite having polyester film thermally adhered to paper (with the paper on the intermediate layer side), (4) a composite obtained by superposing a polyester film, an adhesive layer, an aluminum foil layer, an adhesive layer, and a polyester film sequentially in the order mentioned and dry-laminating the superposed layer by means of the adhesive layers mentioned above, and (5) a composite obtained by superposing an aluminum-evaporated polyester film (polyester film having aluminum evaporated thereon), an adhesive layer, and a polyester film sequentially in the order mentioned and dry-laminating the superposed layers by means of the adhesive layer mentioned above (with the polyester film on the intermediate layer side), for example, may be employed.

The oxidation of the high-pressure polyethylene may be the oxidation caused by heating the high-pressure polyethylene to an elevated temperature (for imparting a molten state to the high-pressure polyethylene, for example) and enabling the oxygen in the air to induce oxidation owing to the elevated temperature (this oxidation referred to hereinafter as "thermal oxidation"), the oxidation induced forcedly, for example, by blowing ozone thereto (this oxidation referred to hereinafter as "forced oxidation"), or the oxidation due to the combination of the thermal oxidation and the forced oxidation. For example, in the case of the thermal oxidation, the amount of the oxidation can be adjusted by suitably varying the temperature of the high-pressure polyethylene, and in the case of the forced oxidation, the amount of the oxidation can be adjusted by suitably varying the concentration of the ozone.

The water-soluble film may have the surface thereof contiguous to the intermediate layer subjected to a corona treatment.

A laminated film according to a second aspect of the present invention is a laminated film according to the first aspect, wherein the water-soluble substrative film comprises at least one material selected from the group consisting of polyvinyl alcohol, vinyl acetate, vinyl acetate type resin, polyacrylamide, polyethylene oxide, and polyvinylpyrrolidone.

The water-soluble substrative film may be the film of such a water-soluble synthetic polymer as partially saponified polyvinyl alcohol. A water-soluble polyvinyl alcohol type film, for example, may be used as the water-soluble substrative film. As concrete examples of the water-soluble polyvinyl alcohol type film, partially saponified polyvinyl acetate, or polyvinyl alcohol denatured with maleic acid, itaconic acid or the like. The degree of saponification may be in the range of 70–98 mol % and the degree of polymerization may be in the range of 500–3000. These degrees of saponification and polymerization can be suitably determined in respect of the degree of water-solubility, the strength of the film, and the speed of solution in water.

For example, the water-soluble substrative film may be (1) the film of a partially saponified polyvinyl alcohol not being denatured, (2) the film of polyvinyl alcohol denatured with a carboxylic acid, (3) the film of a denatured polyvinyl alcohol incorporating therein an oxyalkylene group or a cationic group, or (4) the film of a denatured polyvinyl alcohol containing a sulfonic acid group. As a concrete example of the water-soluble film of a denatured polyvinyl alcohol containing a sulfonic acid group, the water-soluble film of a denatured polyvinyl alcohol which is disclosed in JP-A-07-118,407 may be cited. This film is produced by forming in the shape of a film a denatured polyvinyl alcohol containing 0.1–20 mol % of a sulfonic acid group-containing unit represented by the following chemical formula (6).

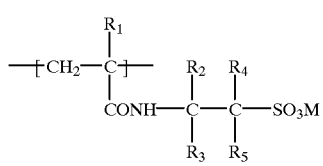

(6)

In the chemical formula (6), $R_1$ is a hydrogen atom or a lower alkyl group, $R_2$ is an alkyl group, $R_3$, $R_4$ and $R_5$ are each independently a hydrogen atom or an alkyl group, and M is a hydrogen atom, an alkali metal atom, an ammonium group, or an amine.

A laminated film according to a third aspect of the present invention is a laminated film according to the first or the second aspect, wherein the water-soluble anchor coating agent is a polyethylene-imine type anchor coating agent.

The polyethylene-imine type anchor coating agent contains polyethylene-imine. The polyethylene-imine is a water-soluble polymer resin obtained by polymerization of ethylenimine having very high reactivity which contains an imino group of 3-ring structure, and the polyethylene-imine is hardly changed chemically. Therefore, when a bag for accommodating agricultural chemicals or the like is made of the laminated film, it is especially preferable to employ the polyethylene-imine type anchor coating agent as the water-soluble anchor coating agent as in the third aspect mentioned above.

In the first and second aspects mentioned above, however, the water-soluble anchor coating agent may be the other water-soluble anchor coating agent such as an organotitanium type anchor coating agent or a polybutadiene type anchor coating agent.

A method for producing a laminated film according to a fourth aspect of the present invention comprises: a step of extruding a melted and thermally oxidized high-pressure polyethylene in the form of a film between an outer-layer-film including one or more layers and a water-soluble substrative film, a water-soluble anchor coating agent being applied in advance on a surface of the water-soluble substrative film contiguous to the outer-layer-film; and a step of compressing and meanwhile cooling the outer-layer-film, the water-soluble substrative film on which the water-soluble anchor coating agent is applied in advance, and the film of high-pressure polyethylene.

A method for producing a laminated film according to a fifth aspect of the present invention comprises: a step of extruding a melted and thermally oxidized high-pressure polyethylene in the form of a film between a high-pressure polyethylene layer and a water-soluble substrative film, the high-pressure polyethylene layer being formed in advance at least on one surface of an outer-layer-film including one or more layers, a water-soluble anchor coating agent being applied in advance on a surface of the water-soluble substrative film contiguous to the outer-layer-film; and a step of compressing and meanwhile cooling the outer-layer-film on which the high-pressure polyethylene layer is formed in advance, the water-soluble substrative film on which the water-soluble anchor coating agent is applied in advance, and the film of high-pressure polyethylene.

The laminated film production methods according to the fourth and the fifth aspects mentioned above are examples of methods for producing the laminated films according to the first through the third aspects mentioned above. In the fourth aspect mentioned above, when the temperature of the melted and thermally oxidized high-pressure polyethylene to be extruded in the form of a film is relatively low, the fast adhesion can not be completely attained between the outer-layer-film and the high-pressure polyethylene constituting the intermediate layer, so that there are some cases where the possibility of the separation between the outer-layer-film and the intermediate layer exists. In this regard, in the fifth aspect mentioned above, even if the temperature of the melted and thermally oxidized high-pressure polyethylene to be extruded in the form of a film is relatively low, the extruded high-pressure polyethylene and the high-pressure polyethylene layer formed in advance on the outer-layer-film are unified. The unified both high-pressure polyethylene becomes the intermediate layer in the first through the third aspects mentioned above. For example, forming the high-pressure polyethylene layer in advance on the outer-layer-film can be performed by the extrusion lamination. If the temperature of the high-pressure polyethylene to be extruded in this extrusion lamination in order to form in advance the high-pressure polyethylene layer on the outer-layer-film is high, the fast adhesion can be attained between the outer-layer-film and the high-pressure polyethylene layer formed in advance on the outer-layer-film. Consequently, according to the fifth aspect mentioned above, even if the temperature of the high-pressure polyethylene to be extruded in the form of a film in order to attain the week adhesion to the water-soluble film is relatively low, the fast adhesion can be attained between the outer-layer-film and the intermediate layer.

Incidentally, in the fourth and the fifth aspects mentioned above, prior to the step of compressing, ozone may be blown against the surface of the film of the high-pressure polyethylene destined to contact with the water-soluble film. In the fourth and the fifth aspects mentioned above, prior to the step of compressing, the surface of the water-soluble substrative film destined to contact with the outer-layer-film may be subjected to a corona treatment before or after applying the water-soluble anchor coating agent on the surface. In the fourth and the fifth aspects mentioned above, the water-soluble substrative film may be dried prior to the application of the water-soluble anchor coating agent.

A bag according to a sixth aspect of the present invention is made of at least one laminated film set forth in any of the first through the third aspects. The at least one laminated film is formed in the shape of a bag opened on one side thereof. The at least one laminated film is superposed so that the water-soluble film is positioned inside. Prescribed portions of the superposed laminated film are heat-sealed so that the parts of the water-soluble film facing to each other at the prescribed portions are fused to each other.

A package according to a seventh aspect of the present invention comprises a hermetically sealed bag made of at least one laminated film set forth in any of the first through third aspects, and a prescribed commodity placed in the bag. The at least one laminated film is superposed so that the water-soluble film is positioned inside. Prescribed portions of the superposed laminated film are heat-sealed so that the parts of the water-soluble film facing to each other at the prescribed portions are fused to each other.

A package according to an eighth aspect of the present invention is a package according to the seventh aspect, wherein the commodity is agricultural chemicals, medicament, food, or ground bait.

For example, the laminated film according to any of the first through the third aspects mentioned above can be produced by the methods for production according to the fourth and the fifth aspects mentioned above. These methods for production are based on the technique of extrusion lamination. Since these methods for production use the high-pressure polyethylene in a molten state, the high-pressure polyethylene has a high temperature and, therefore, is subjected to thermal oxidation. The amount of the oxidation by the thermal oxidation is determined by the temperature of the high-pressure polyethylene and the duration of the exposure thereof to the ambient air and the like.

The bag according to the sixth aspect mentioned above is an example of the bag which is made of the laminated film according to any of the first through the third aspects mentioned above. Generally, in the bag supplying method already described, the bag is supplied from a manufacturer of bags to a manufacturer of commodities to be accommodated therein. The package according to the seventh aspect mentioned above is the product obtained by placing prescribed commodity in a bag similar to the bag according to the sixth aspect mentioned above using the laminated film according to any of the first through the third aspects mentioned above except the bag is in a completely hermetically sealed state. The package constitutes itself the final form in which the commodity reaches the consumer thereof. The package according to the seventh aspect may be a product produced by using the bag of the sixth aspect in accordance with the bag supplying method mentioned above or a product produced by using the laminated film of any of the first through third aspects mentioned above in accordance with the automatic packaging method mentioned above.

In the package according to the seventh aspect mentioned above, like that of the eighth aspect mentioned above, the commodity accommodated therein is not limited to agricultural chemicals. The commodity accommodated may be other commodities such as, for example, medicament, food, and ground bait. The package may accept still other commodities which are used by placing in liquids capable of dissolving the water-soluble film. It is particularly effective in accommodating such commodities as do harm to the human skin, emit offensive odor, or defile the ambience. The form of the commodity is not limited to powder. The commodity may be a granular substance or a liquid substance. When the liquid commodity is an organic solvent, for example, it has no possibility of dissolving the water-soluble film.

In the laminated film according to any of the first through the third aspects mentioned above, the outer-layer-film and the intermediate layer adhere fast to each other, and the intermediate layer and the water-soluble film directly contact each other and adhere so weakly to each other as to peelable. The package according to the seventh aspect mentioned above which uses the laminated film, therefore, has a double-wall structure consisting of the outer-layer-film and the intermediate layer (hereinafter collectively referred to as "outer bag film" for the sake of explanation) which adhere fast to each other and act as an outer bag and the water-soluble film which acts as an inner bag. In this structure, the outer bag film and the water-soluble film adhere so weakly to each other as to be peelable. The user of the commodity in the package, therefore, is only required to peel the outer bag film (although whether or not a part of the water-soluble anchor coating agent remains adhering to the intermediate layer at this time is not clear, there is no problem in either case.) in gaining access to the commodity accommodated in the inner bag of the water-soluble film similarly to the aforementioned composite package consisting of an inner bag and an outer bag. When the commodity happens to be agricultural chemicals, the outer bag does not suffer the commodity to drift up when it is peeled and the inner bag still accommodating the commodity can be placed in a tank and diluted with the water placed in the tank (because the inner bag made of the water-soluble film dissolves on contact with water). This package, therefore, ensures perfect ease of handling because the commodity accommodated therein no longer has the possibility of doing harm to the user's system or jeopardizing the safety.

Since the laminated film according to any of the first through the third aspects mentioned above can be handled during the insertion of the commodity therein in the same manner as the conventional laminated film, the existing automatic machines and other devices can be used in their unmodified form. The bag incurs no noticeable addition to the cost of production because it obviates the necessity of separately producing inner bags unlike the aforementioned composite bag consisting of an inner bag and an outer bag.

In the laminated film according to any of the first through the third aspects mentioned above, it is thought that only linkage between the carbonyl group of the oxidized high-pressure polyethylene and the hydroxyl group of the water-soluble substrative film and the anchor effect or the like (this mechanism is not clear.) due to the water-soluble anchor coating agent are induced. Therefore, there is no possibility that the high-pressure polyethylene and the water-soluble film will induce the other chemical reactions with the elapse of time. Unlike the laminated film of the type using an adhesive as mentioned above, the present laminated film can obtain stable adhesive force with the elapse of time between the intermediate layer and the water-soluble film due to a sparing possibility of the change of the properties of the high-pressure polyethylene and the water-soluble film with the elapse of time. As a result, there is no possibility that the outer bag film will not be easily peeled off the water-soluble film when the user seeks to use the commodity accommodated in the bag. There is no possibility that the outer bag film will be peeled off the water-soluble film before the bag reaches the user. There is no possibility that the water-soluble film will have pinholes therein. There is no possibility that the water-soluble film will suffer degradation of the water-solubility thereof. Further, since the adhesive force between the outer bag film and the water-soluble film (namely, between the intermediate layer and the water-soluble film) originates in the union of relatively weak binding strength produced between the carbonyl group of the oxidized high-pressure polyethylene and the hydroxyl group of the polyvinyl alcohol and the anchor effect or the like due to the water-soluble anchor coating agent as already described, there is no possibility that the components of the intermediate layer remain on the water-soluble film after peeling the outer bag film. As a result, there is no possibility that, after the water-soluble film has been dissolved in water in preparation for use of the commodity such as the agricultural chemicals accommodated therein, the components of the intermediate layer will react with the components of the commodity such as the agricultural chemicals accommodated in the bag to deteriorate the commodity. Since the intermediate layer, unlike the adhesive, can be formed so as to have a relatively large thickness, the intermediate layer additionally functions as a protector against a mechanical shock. In the case of using adhesive, sufficient moisture-proofing ability can not be obtained since the adhesive produces pinholes due to a coating. The intermediate layer functions so as to enhance the moistureproofing ability since intermediate layer does not produce such pinholes thereof.

In the laminated film according to any of the first through the third aspects mentioned above, since the water-soluble film is made of not only the water-soluble substrative film such as polyvinyl alcohol film but also the water-soluble anchor coating agent distributed on the surface of the water-soluble substrative film contiguous to the intermediate layer, in accordance with the present inventor's knowledge as mentioned above, the state of adhesion based on the week adhesion between the intermediate layer and the water-soluble film can be suitably adjusted at the heat-sealed portions of a bag such as the bag of the package according to the seventh aspect mentioned above, and thereby even if the heat-sealed portion is greatly bent in such a manner that a crease is generated from the inside area of the heat-sealed portion to the outer edge of the bag, it is hard to make a gap between the intermediate layer and the water-soluble film at the outer edge portion of the crease. Since water-soluble anchor coating agent has a water-solubility, there is no possibility of impairing the solubility of the water-soluble film.

DESCRIPTION OF THE PREFERRED EMBODIMENTS

Embodiments of the present invention will be described specifically below.

Figure 1:
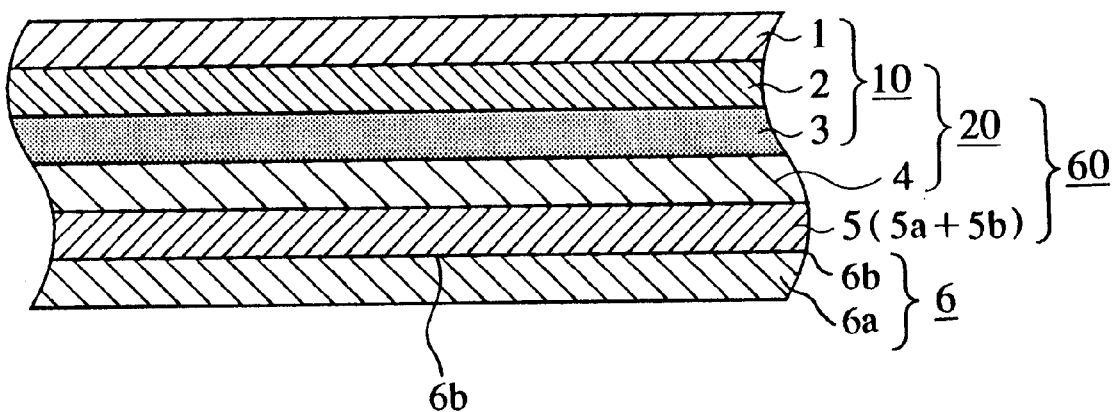
FIG. 1 is a cross section illustrating schematically a laminated film according to an embodiment of the present invention.

FIG. 1 is a cross section illustrating schematically a laminated film according to an embodiment of the present invention.

The laminated film according to the present embodiment, as shown in FIG. 1, is composed of an outer-layer-film 20, a water-soluble film 6, and an intermediate layer 5 interposed between the outer-layer-film 20 and the water-soluble film 6, the intermediate layer 5 containing high-pressure polyethylene oxidized to a prescribed degree at least on the surface thereof contiguous to the water-soluble film 6. The outer-layer-film 20 and the intermediate layer 5 adhere fast to each other. The intermediate layer 5 and the water-soluble film 6 contact directly each other and adhere so weakly to each other as to be peelable. The film composed of the outer-layer-film 20 and the intermediate layer 5 is referred to as the outer bag film 60. In the present embodiment, the water-soluble film 6 is composed of a water-soluble substrative film 6a and a water-soluble anchor coating agent 6b distributed on a surface of the water-soluble substrative film 6a contiguous to the intermediate layer 5.

In the present embodiment, the outer-layer-film 20 is composed of a substrative film 10 and an anchor coating agent layer 4. The substrative film 10 is formed by extrusion lamination, and is composed of a polyester film 1, a high-pressure polyethylene layer 2, and an aluminum foil layer 3.

Specifically, a commercially available PET#12 produced by Unitika Ltd. of Japan and marketed under trademark designation of "Emblet Polyester Film" is used as the polyester film 1. A layer 20 μm in thickness of a commercially available LDPE (high-pressure low-density polyethylene), produced by Nippon Polyolefins Co., Ltd. of Japan and marketed under product code of "L178" is used as the high-pressure polyethylene layer 2. A commercially available aluminum foil, 7 μm in thickness, produced by Showa Aluminum Co., Ltd. of Japan is used as the aluminum foil 3.

A commercially available LDPE (high-pressure low-density polyethylene), one species of high-pressure polyethylene, produced by Nippon Polyolefins Co., Ltd. of Japan and marketed under product code of "L178" is used as the intermediate layer 5 like the high-pressure polyethylene layer 2. In the present embodiment, the intermediate layer 5 composed of a layer, 30 μm in total thickness, obtained by unifying a 15 μm thick layer 5a of "L178" formed in advance on the anchor coating agent layer 4 (on the lower surface of the layer 4 in FIG. 1) by the extrusion lamination with a 15 μm thick layer 5b of "L178" formed later on the layer 5a by the extrusion lamination as mentioned later.

A commercially available polyvinyl alcohol film, 40 μm in thickness, produced by Kuraray Co., Ltd. of Japan and marketed under product code of "VF-HP" is used as the water-soluble film 6. "VF-HP" has structure similar to the denatured polyvinyl alcohol disclosed in JP-A-07-118,407 mentioned above.

A commercially available polyethylene-imine type anchor coating agent produced by TOSOH CORPORATION (formerly "TOYOSODA CORPORATION") of Japan and marketed under product code of "AC-P" is used as the water-soluble anchor coating agent 6b. As mentioned later, in the production of the laminated film, "AC-P" is diluted with methanol at the predetermined rate, and "AC-P" is distributed on the surface of the water-soluble substrative film 6a contiguous to the intermediate layer 5 by applying a predetermined quantity of the diluted "AC-P" on the water-soluble substrative film 6a. The solid matter (this is mainly polyethylene-imine, and the solid matter is the substantial water-soluble anchor coating agent.) in "AC-P" is approximately 5%. It is thought that the laminated film hardly includes the matter except for the solid matter.

Figure 2:
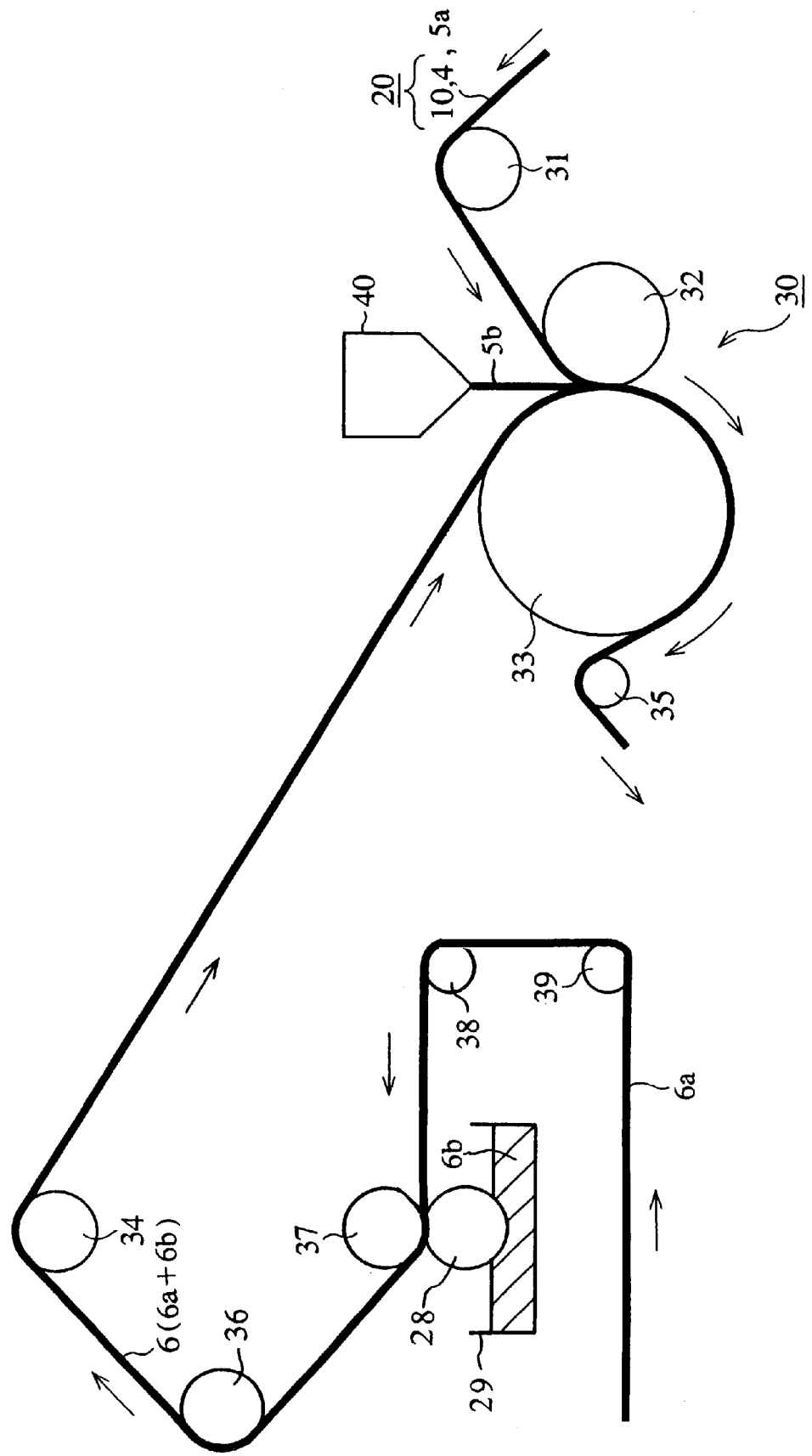
FIG. 2 is a diagram illustrating schematically a part of the process for the production of a laminated film according to an embodiment of the present invention.

The present inventors actually produced a plurality of kinds (Sample No. 1–3) of the laminate film of the structure described above, with part of the prescribed production conditions and the quantity of the application of the solid matter of the water-soluble anchor coating agent 6b varied as specifically described below. The method for this production is as follows. FIG. 2 is a diagram schematically illustrating a part of the process of the production.

Figure 3:
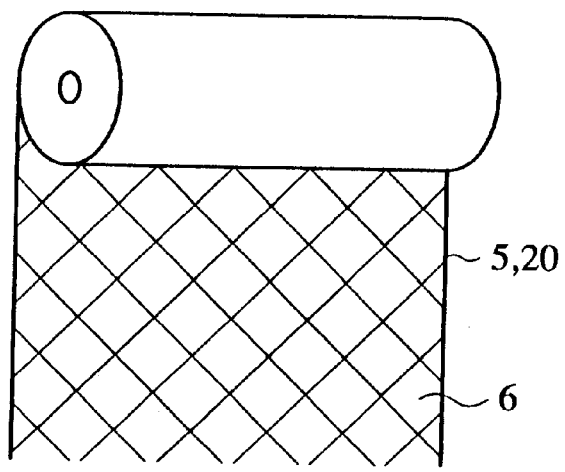
FIG. 3 is a diagram illustrating a laminated film taken up in the shape of a roll.

First, the substrative film 10 was prepared by extrusion laminating "Emblet PET" (polyester film 1) and the aluminum foil 3 through "L178" to be the layer 2. Then, after the anchor coating agent 4 was applied on the surface of the aluminum foil 3, the layer 5a of "L178" was in advance formed on that by extrusion lamination. The substrative film 10 and the anchor coating agent 4 constitutes the outer-layer-film 20. As shown in FIG. 2, the substrative film 10, on which the anchor coating agent 4 and the layer 5a of "L178" were formed in advance in such a manner, was forwarded via a guide roller 31 of a laminating device 30 and guided to the position between a pressure roller 32 and a cooling roller 33 of the laminating device 30. The substrative film 10, on which the anchor coating agent 4 and the layer 5a of "L178" were formed in advance, was disposed with the "L178" layer 5a side thereof held on the upper side in FIG. 2. On the other hand, "VF-HP" (water-soluble substrative film 6a) was forwarded via guide rollers 39, 38 of the laminating device 30 and guided to the position between a coating roller 28 and a guide roller 37, so that "AC-P" diluted with methanol (which corresponds to the water-soluble anchor coating agent 6b) was applied on one surface of "VF-HP" (water-soluble substrative film 6a) at the application quantity of 4.7 g/m$^2$ by means of the coating roller 28. In FIG. 2, 29 denotes a receptacle for accommodating the diluted "AC-P" (which corresponds to the water-soluble anchor coating agent 6b) so as to supply to the coating roller 28. The "VF-HP" on which the diluted "AC-P" was applied, which corresponds to the water-soluble film 6, was forwarded via guide rollers 36, 34 and guided, in the state that the side of the diluted "AC-P" (which corresponds to the water-soluble anchor coating agent 6b) is held on the upper side in FIG. 2, from the side opposite the substrative film 10 on which the anchor coating agent 4 and the "L178" layer 5a to the position between the pressure roller 32 and the cooling roller 33. The majority of the matter except for the solid matter in the diluted "AC-P" is volatilized before the compression is performed as mentioned latter by being guided to the position between the pressure roller 32 and the cooling roller 33. Simultaneously, from above the position intervening between the pressure roller 32 and the cooling roller 33, a molten "L178" (the substance destined to the layer 5b which constitutes the intermediate layer 5 together with the layer 5a) was extruded in the form of a film by an extruding device 40 toward the position between the substrative film 10 on which the anchor coating agent 4 and the layer 5a of "L178" were formed in advance and the "VF-HP" on which the diluted "AC-P" was applied (which collectively corresponds to the water-soluble film 6). As a result, the outer-layer-film 20 on which the layer 5a of "L178" was formed in advance, the film 5b of "L178", and the "VF-HP" on which the solid matter in "AC-P" (the anchor coating agent 6b) was applied in advance were compressed while cooled by the pressure roller 32 and the cooling roller 33 and consequently converted to the laminated film shown in FIG. 1 mentioned above. The laminated film was guided to a guide roller 35 and taken up as shown in FIG. 3 as will be specifically described below.

The extruding device 40 used herein was of a type qualified by L/D=32 and D=90 mm (diameter), wherein L is the length of a screw and D is the diameter of the screw. The pulling out speed of the laminating device 30 was set at 100 m/min.

The laminated films of Sample No. 1–3 having the structure as shown in FIG. 1 were produced by the producing method mentioned above while only the quantity of the application of the solid matter of "AC-P" as the water-soluble anchor coating agent 6b and the temperature of the dies of the extruding device 40 (the temperature of the "L178" 5b before the "L178" is extruded by the extruding device 40) were varied.

As shown in Table 1, the laminated film of Sample No. 1 was produced, under the condition that the solution obtained by diluting 1 Kg of "AC-P" with 14 Kg of methanol is applied at the application quantity of 4.7 g/m$^2$ (therefore, it is calculated that the application quantity of the solid matter of "AC-P" is 0.016 g/m$^2$ based on the fact that the solid matter in "AC-P" is approximately 5%.) and the conditions that the dies temperature is set to 325° C. and the cylinder temperature is set according as the dies temperature.

TABLE 1

| Sample No. | AC agent application quantity (g/m$^2$) | Dies temperature (° C.) |
|---|---|---|
| 1 | 0.016 | 325 |
| 2 | 0.034 | 310 |
| 3 | 0.034 | 320 |
| 4 | 0 | 335 |

The laminated film of Sample No. 2 was produced, under the condition that the solution obtained by diluting 2 Kg of "AC-P" with 12 Kg of methanol is applied at the application quantity of 4.7g/m$^2$ (therefore, it is calculated that the application quantity of the solid matter of "AC-P" is 0.034 g/m$^2$ based on the fact that the solid matter in "AC-P" is approximately 5%.) and the conditions that the dies temperature is set to 310° C. and the cylinder temperature is set according as the dies temperature.

The laminated film of Sample No. 3 was produced, under the condition that the solution obtained by diluting 2 Kg of "AC-P" with 12 Kg of methanol is applied at the application quantity of 4.7 g/m$^2$ (therefore, it is calculated that the application quantity of the solid matter of "AC-P" is 0.034 g/m$^2$ based on the fact that the solid matter in "AC-P" is approximately 5%.) and the conditions that the dies temperature is set to 320° C. and the cylinder temperature is set according as the dies temperature. The laminated film of Sample No. 4 having the structure as shown in FIG. 1 (however, the water-soluble film 6 is composed of only "VF-HP" which is the water-soluble substrative film 6a.) was produced as a comparative example by the production method mentioned above under the condition that the solution obtained by diluting "AC-P" with methanol (that is, the water-soluble anchor coating agent 6b) is not applied at all and the conditions that the dies temperature is set to 335° C. and the cylinder temperature is set according as the dies temperature. Further, the laminated film of Sample No. 4 was produced, in the manner that the substrative film 10 on which the anchor coating agent 4 was applied in advance but the layer 5a of "L178" was not formed is guided to the position between the pressure roller 32 and the cooling roller 33. Therefore, in the laminated film of the Sample No. 4, the intermediate layer 5 is composed of only the "L178" 5b extruded by the extruding device 40. This is because "L178" can adhere fast through the anchor coating agent 4 to the aluminum foil 3 by the extrusion lamination since the dies temperature is set to high temperature such as 335° C. In other words, in the case of the laminated films of Sample No. 1–3, since the dies temperature is relatively low, if the intermediate layer 5 is composed of only the "L178" 5b like the laminated film of Sample No. 4, the possibility exists that the intermediate layer 5 and the outer-layer-film 20 do not adhere fast to each other. Consequently, the laminated films of Sample No. 1–3 were produced in the manner mentioned above. The production method according to the present invention, however, may be a production method similar to the production method of the laminated film of Sample No. 4 when the dies temperature is set to relative high temperature. Incidentally, the thickness of the intermediate layer 5 of the laminated film of Sample No. 4 was 15 μm. The laminated film of Sample No. 4 was produced under the conditions same as the laminated films of Sample No. 1–3 except for the respects mentioned above.

Now, a typical bag formed with the laminated film of the structure of FIG. 1 will be described below with reference to FIG. 3 and FIG. 4.

FIG. 3 represents the laminated film of FIG. 1, which has the water-soluble film 6 laminated through the intermediate layer 5 on the outer-layer-film 20 throughout the entire surface thereof and is taken up in the shape of a roll. FIG. 4 represents an example of the bag made of the laminated film shown in FIG. 3. In this bag, the laminated film is formed in the shape of a bag opened on one side thereof. In this bag, the laminated film is superposed by folding so that the water-soluble film 6 is positioned inside, and prescribed portions of the superposed laminated film are heat-sealed so that the parts of the water-soluble film 6 facing to each other at the prescribed portions are fused to each other. In the bag shown in FIG. 4, the right side constitutes itself a folding line and portions 302, 301 along the left side, a portion 305 along the upper side, and a strip portion 306 separated by a prescribed distance from the upper side and extended parallel to the upper side are heat-sealed and the lower side is left open to basically give rise to what is called an L-shaped sealed bag. In the bag shown in FIG. 4, the part which is enclosed with the heat-sealing portions 302 and 306, and a portion 307 extended along the lower side which will be heat-sealed after a prescribed commodity has been inserted in the bag through the opening in the lower side constitutes itself an area (non-heat-sealed portion) 308 destined to accommodate the commodity. In FIG. 4, 310 denotes perforations. The perforations 310 are linearly formed parallel to the lower side of the heat-sealed portion 305 at a position slightly lower than the lower side of the heat-sealed portion 305 and are allowed to reach the left side of the heat-sealed portion 301 and the right side of a non-heat-sealed portion 309. At the left end of the perforations 310 (namely, the heat-sealed portion 301), a notch 311 for facilitating the excision along the perforations 310 is formed. The shape of the bag is not limited to the shapes mentioned above. Bags in arbitrarily selected shapes including a three-side sealed bag, a gusset-type bag and a backlining-type bag can be produced with the laminated film of the present invention. In the bag shown in FIG. 4, as clear from the latter description, the heat-sealed portions 301 and 305, non-heat-sealed portion 309, the perforations 310 and the notch 311 forms a beginning for peeling the outer bag film 60. The structure for forming such a beginning is not limited to this structure.

Figure 4:
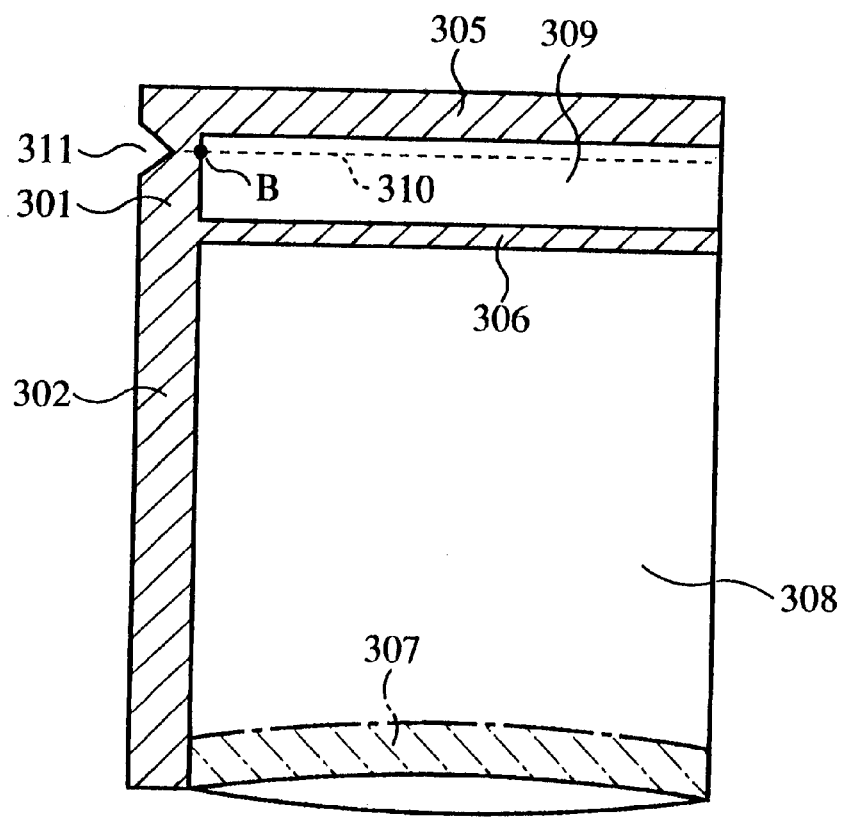
FIG. 4 is a diagram illustrating a bag according to an embodiment of the present invention.

The bag shown in FIG. 4 which opens in the lower side, in the case of the bag supplying method, are produced by a manufacturer of bags and then supplied to a manufacture of commodities accommodated therein. In the case of the bag supplying method, the manufacturer of commodities places his commodities into the bag shown in FIG. 4 through the openings in the lower side and subsequently heat-seals the portion 307 along the lower side to complete packages, i.e. the products in the finished state in which they reach users of the commodities. In the case of the automatic packaging method, the manufacturer of commodities performs continuously the operation of producing bag shown in FIG. 4 from the laminated film shown in FIG. 3, filling the bag with his commodities, and heat-sealing the portion 307 of the bag along the lower side.

The bag of the package is in a double-wall structure consisting of the outer-layer-film 20 and the intermediate layer 5 (hereinafter collectively referred to as "outer bag film 60" for the sake of explanation) which adhere fast to each other and function as an outer bag and the water-soluble film 6 which functions as an inner bag. The outer bag film 60 and the water-soluble film 6 adhere so weakly to each other as to be peelable. The user of the commodity in the package, therefore, has only to peel the outer bag film 60 to gain access to the commodity accommodated in the inner bag formed of the water-soluble film 6 like the aforementioned composite bag which consists of an inner bag and an outer bag.

The present inventors produced four kinds of the bag shown in FIG. 4 with each of the laminated films of Sample No. 1–4 mentioned above. In these bags, however, for the purpose of the test, the portion 307 along the lower side was heat-sealed without accommodating a commodity therein. These bags were produced with each of the laminated films of Sample No. 1–4 left standing for three or more days in the normal environment after the aging (the process of placing the laminated film in the environment kept at 40–45° C.) was performed for 48 hours after their manufacture. Such the aging, however, is not indispensable. For the bags produced by using each of the laminated films of Sample No. 1–4 in the manner mentioned above, the measurement of the peel strength (adhesive force or adhesive strength) and the bending test as mentioned latter were performed. The results of the measurement and the test are shown in Table 2 below. Objects to be measured in the measurement of the peel strength were pieces cut from the non-heat-sealed portion 308 and the heat-sealed portion 302 of the bags, and the peel strength was measured between the outer bag film 60 and the water-soluble film 6 in each of the pieces. The peel strength was measured by the use of a horizontal tensile strength tester produced by Tester Sangyo Co., Ltd. of Japan under the conditions of 180° peel and 15 mm width in accordance with JIS (Japanese Industrial Standard) P8113.

TABLE 2

| Sample No. | Peel strength after 1~2 days after manufacture of bag (g/15 mm) | | Peel strength after 1~2 weeks after manufacture of bag (g/15 mm) | | Bending test of heat-sealed portion |
|---|---|---|---|---|---|
| | Non-heat-sealed portion | Heat-sealed portion | Non-heat-sealed portion | Heat-sealed portion | |
| 1 | 25~35 | 30~40 | 5~10 | 10~15 | Gap is not made when five times |
| 2 | 20~50 | 160 | about 10 | about 10 | Gap is not made |

TABLE 2-continued

| Sample No. | Peel strength after 1~2 days after manufacture of bag (g/15 mm) | | Peel strength after 1~2 weeks after manufacture of bag (g/15 mm) | | Bending test of heat-sealed portion |
| --- | --- | --- | --- | --- | --- |
| | Non-heat-sealed portion | Heat-sealed portion | Non-heat-sealed portion | Heat-sealed portion | |
| 3 | 40~85 | 170 | about 10 | about 10 | when five times Gap is not made |
| 4 | 5 | 5 | 5 | 5 | when five times Gap is made when one time |

In the bag using the laminated film of Sample No. 1, as shown in Table 2, the peel strengths of the non-heat-sealed portion 308 and the heat-sealed portion 302 were 25~35 g/15 mm and 30~40 g/15 mm respectively after the bag was left standing for one day in the normal environment after the manufacture of the bag (that is, after heat-sealing). In the bag using the laminated film of Sample No. 1, the peel strengths of the non-heat-sealed portion 308 and the heat-sealed portion 302 were 5~10 g/15 mm and 10~15 g/15 mm respectively after the bag was left standing for 1~2 weeks in the normal environment after the manufacture of the bag (that is, after heat-sealing).

In the bag using the laminated film of Sample No. 2, as shown in Table 2, the peel strengths of the non-heat-sealed portion 308 and the heat-sealed portion 302 were 20~50 g/15 mm and 160 g/15 mm respectively after the bag was left standing for two days in the normal environment after the manufacture of the bag (that is, after heat-sealing). In the bag using the laminated film of Sample No. 2, both of the peel strengths of the non-heat-sealed portion 308 and the heat-sealed portion 302 were about 10 g/15 mm after the bag was left standing for 1~2 weeks in the normal environment after the manufacture of the bag (that is, after heat-sealing).

In the bag using the laminated film of Sample No. 3, as shown in Table 2, the peel strengths of the non-heat-sealed portion 308 and the heat-sealed portion 302 were 40~85 g/15 mm and 170 g/15 mm respectively after the bag was left standing for two days in the normal environment after the manufacture of the bag (that is, after heat-sealing). In the bag using the laminated film of Sample No. 3, both of the peel strengths of the non-heat-sealed portion 308 and the heat-sealed portion 302 were about 10 g/15 mm after the bag was left standing for 1~2 weeks in the normal environment after the manufacture of the bag (that is, after heat-sealing).

In the bag using the laminated film of Sample No. 4, as shown in Table 2, both of the peel strengths of the non-heat-sealed portion 308 and the heat-sealed portion 302 were 5 g/15 mm after the bag was left standing for about two days in the normal environment after the manufacture of the bag (that is, after heat-sealing). In the bag using the laminated film of Sample No. 4, both of the peel strengths of the non-heat-sealed portion 308 and the heat-sealed portion 302 were about 5 g/15 mm after the bag was left standing for 1~2 weeks in the normal environment after the manufacture of the bag (that is, after heat-sealing).

Figure 5:
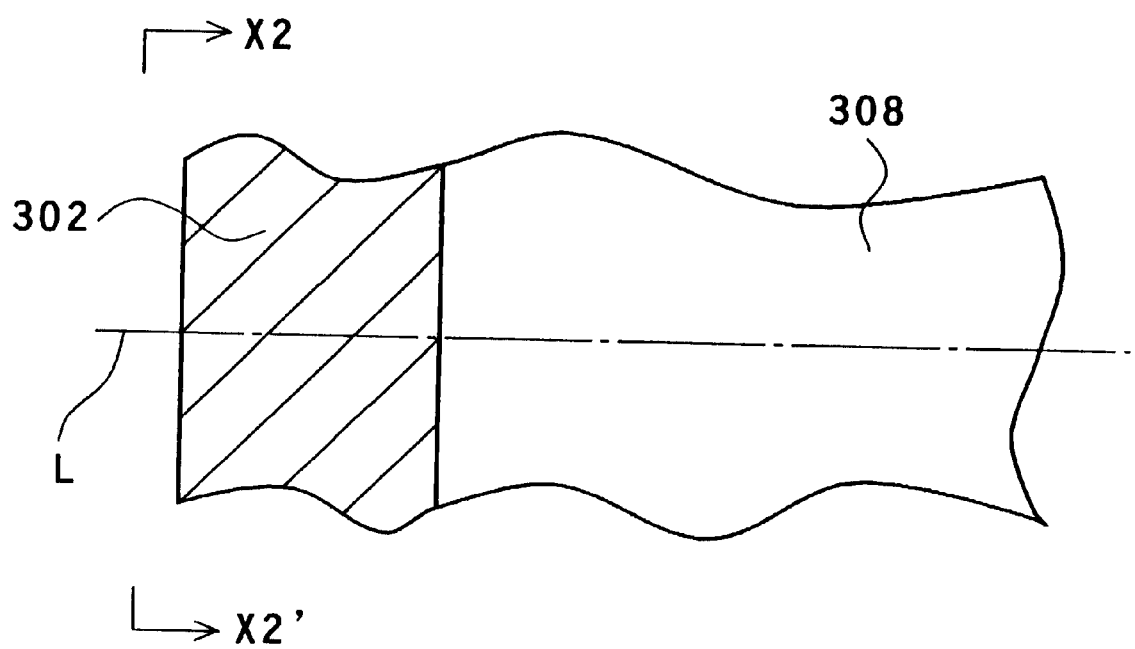
FIG. 5 is a diagram illustrating an enlarged portion of the bag shown in FIG. 4.
Figure 6:
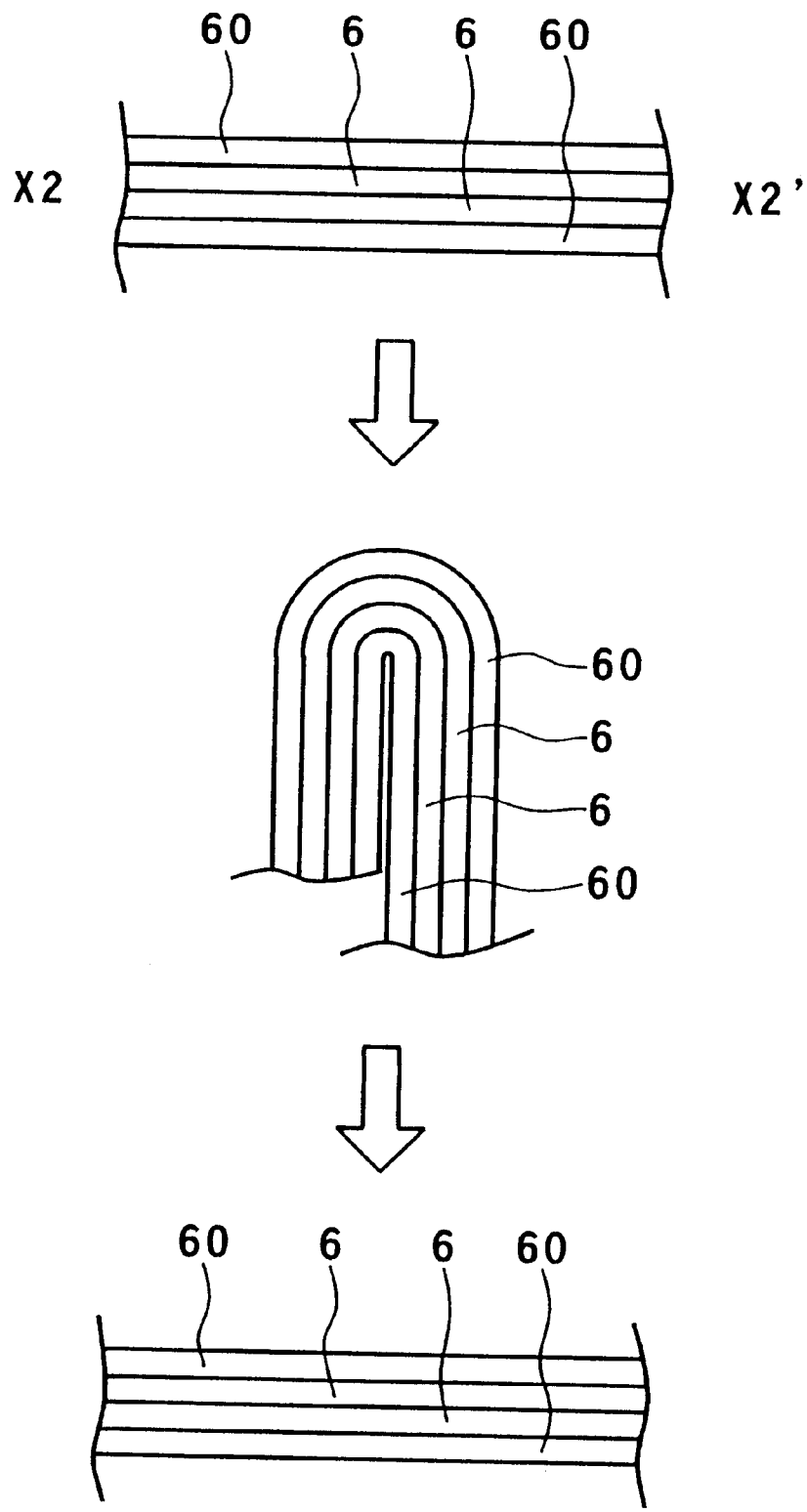
FIG. 6 is a diagram corresponding to a view taken in the direction of the arrows along the line X2–X2' in FIG. 5, which illustrates the state of the bending test of a bag.
Figure 7:
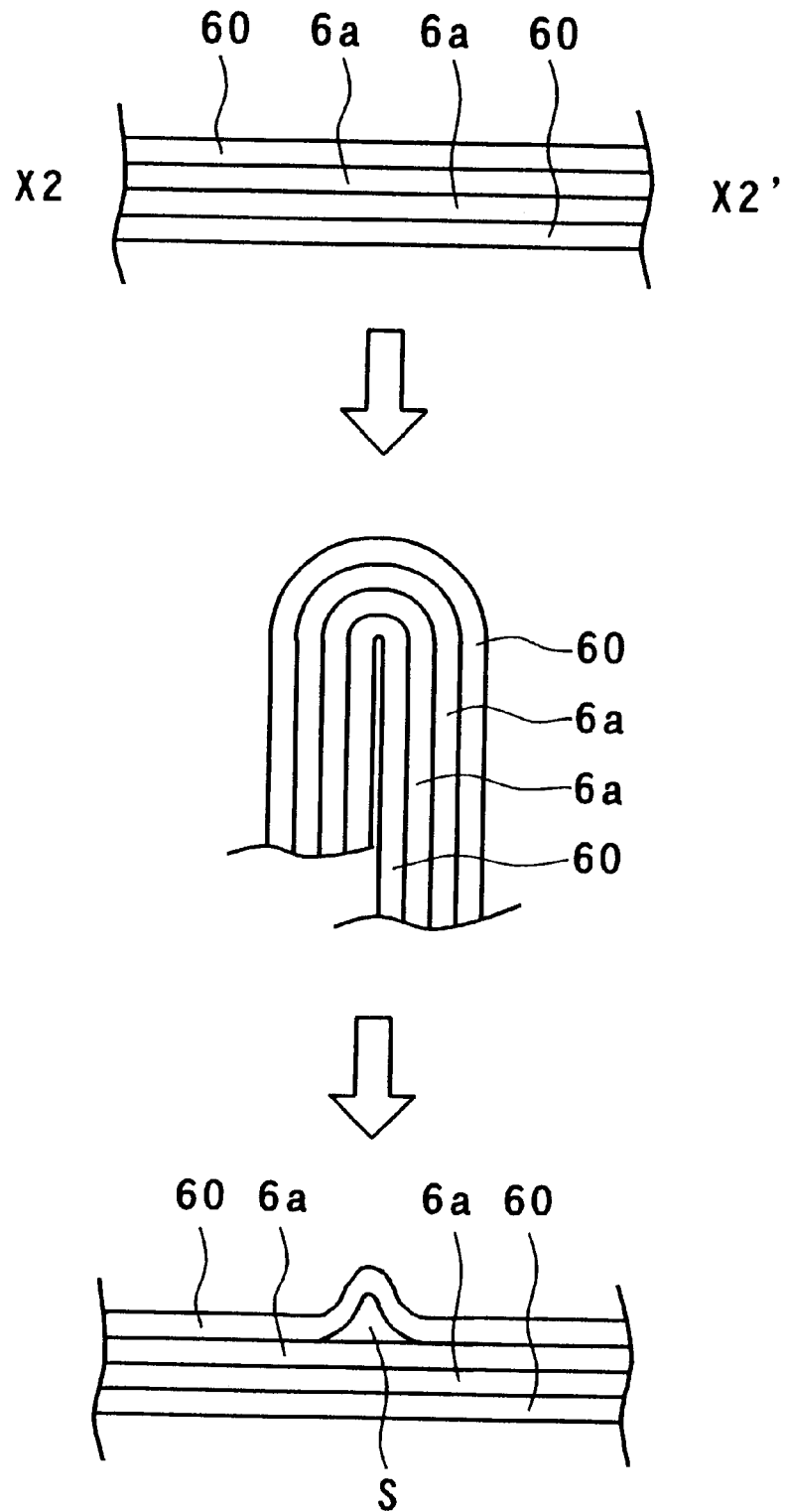
FIG. 7 is a diagram corresponding to a view taken in the direction of the arrows along the line X2–X2' in FIG. 5, which illustrates the state of the bending test of another bag.

Now, the bending test of the heat-sealed portion 302 will be described with reference to FIG. 5–FIG. 7 below. FIG. 5 is a diagram illustrating an enlarged portion of the bag shown in FIG. 4. FIG. 6 is a diagram corresponding to a view taken in the direction of the arrows along the line X2–X2' in FIG. 5, which illustrates the state of the bending test of the bags using each of the laminated films of Sample No. 1–3. FIG. 7 is a diagram corresponding to a view taken in the direction of the arrows along the line X2–X2' in FIG. 5, which illustrates the state of the bending test of the bag using the laminated film of Sample No. 4. As shown in FIG. 5–FIG. 7, after each of the bags is bent 180 degrees along the line L, each of the bags is restored to the unbent state. This process is counted as one time, and is repeated a plurality of times. The bending test of the heat-sealed portion 302 is a test for examining the number of repetition times of the process at which a gap S as shown in FIG. 7 is firstly made between the outer bag film 60 and the water-soluble film 6 (in the case of the bags using the laminated films of Sample No. 1–3) or between the outer bag film 60 and the water-soluble substrative film 6*a* (in the case of the bag using the laminated film of Sample No. 4) at the outer edge portion of the crease L. For the bags using each of the laminated films of Sample No. 1–4, the bending test was performed after the bags were left standing for 1~2 weeks in the normal environment after the manufacture of the bags (that is, after heat-sealing).

As clear from the results of the bending test as shown in Table 2, in the bags using the laminated films of Sample No. 1–3 according to the present embodiment of the present invention, the gap S was not made at the outer edge portion of the crease L even if the process mentioned above was repeated five times. On the other hand, in the bag using the laminated film of Sample No. 4 of the comparative example, the gap S was made at the outer edge portion of the crease L when the process mentioned above is performed one time.

As clear from Table 1 and Table 2, in the bag using the laminated film of Sample No. 4 in which the water-soluble anchor coating agent 6*b* is not applied, although the peeling strength is stable from a point of time immediately after the manufacture of the bag, the peel strength of the non-heat-sealed portion is substantially equal to the peel strength of the heat-sealed portion and is relatively low. In the bag using the laminated film of Sample No. 4, it is noted from the results of the bending test that the gap S is easily made by the crease. This fact means that unintentional peeling of the outer bag film 60 is easily generated in transport of the bag since the gap S becomes a beginning for peeling the outer bag film 60.

On the other hand, in the bags using the laminated films of Sample No. 1–3 according to the present embodiment of the present invention in which the water-soluble anchor coating agent 6*b* is applied, the peel strength decreases with the elapse of time from a point of time immediately after the manufacture of the bag. When 1~2 weeks elapses form a point of time immediately after the manufacture of the bag, the peel strength becomes slightly greater peel strength than the peel strength of the bag using the laminated film of Sample No. 4. Thereafter, the value of the peeling strength, though not shown in the table, is hardly changed, and is stable. This value of the peeling strength is proper to intentionally peel the outer bag film 60. In the bags using the laminated films of Sample No. 1–3, it is remarkably hard to generate the gap S by the bending test process, compared with the bag the laminated film of Sample No. 4. Therefore, it is thought that there is no possibility that unintentional peeling of the outer bag film 60 is generated in transport of the bag. Thus, it is noted that the state of adhesion between the water-soluble film 6 and the intermediate layer 5 can be remarkably improved by applying the water-soluble anchor coating agent 6*b* on the water-soluble substrative film 6*a* although the increase of the final peel strength of the heat-sealed portion is not much.

In any of the bags using the laminated films of Sample No. 1–4, the phenomenon that the components of the intermediate layer 5 remain on the water-soluble film 6 after the outer bag film 60 is peeled was not recognized.

Now, a principle of peeling the outer bag film 60 in the package using the bag shown in FIG. 4 will be described with reference to FIG. 8A–FIG. 8D below.

Figure 8A:
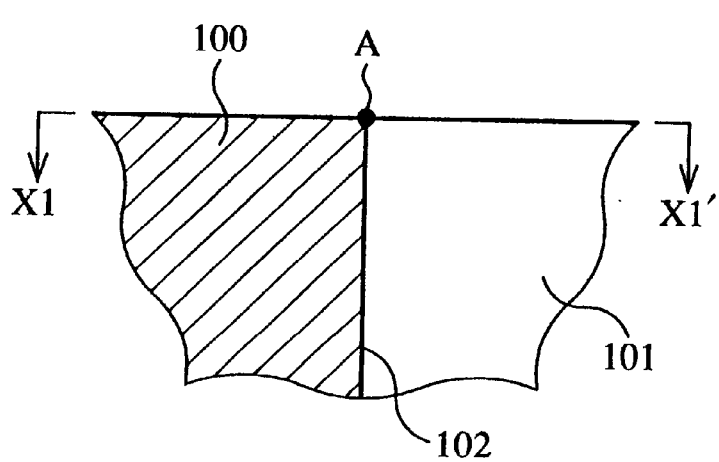
FIG. 8A is a plan view illustrating a laminated film superposed and partly heat-sealed.
Figure 8B:
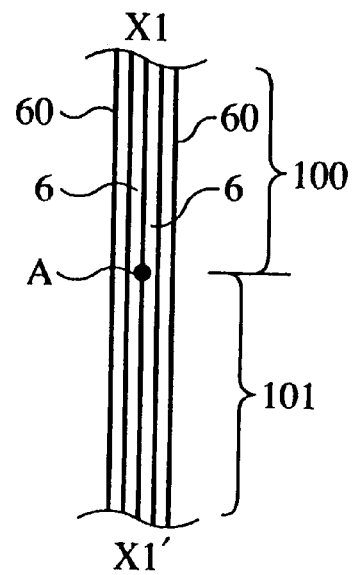
FIG. 8B is a view taken in the direction of the arrows along the line X1–X1' in FIG. 8A.
Figure 8C:
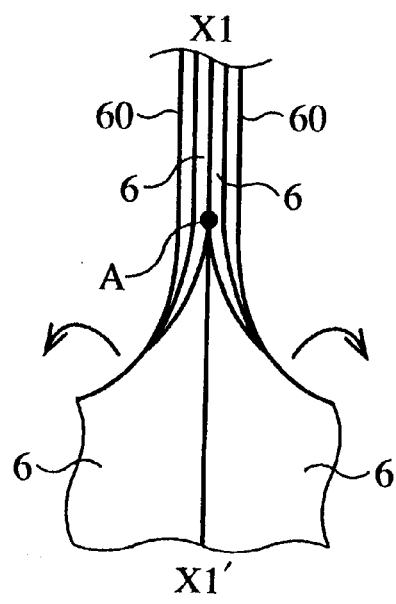
FIG. 8C is a diagram illustrating a process of peeling of the outer bag film.
Figure 8D:
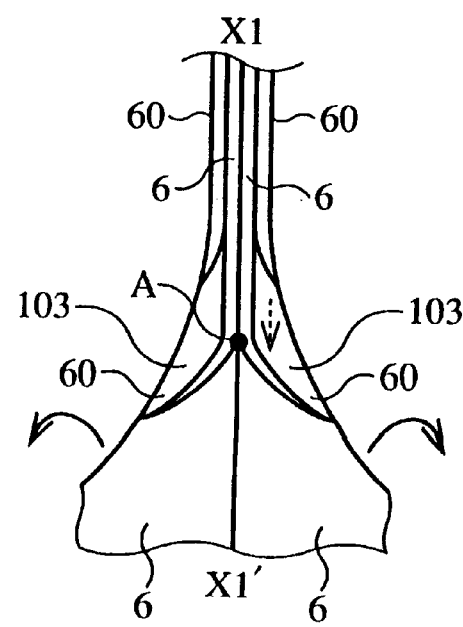
FIG. 8D is a diagram illustrating a process of peeling subsequent to that of peeling shown in FIG. 8C.

FIG. 8A is a plan view of what is obtained by superposing the laminated film shown in FIG. 1 so that the water-soluble film 6 is positioned inside and heat-sealing a part of the superposed laminated film, as seen from the front side thereof. FIG. 8B is a view taken in the direction of the arrows along the line X1–X1' in FIG. 8A. FIG. 8C and FIG. 8D, corresponding to FIG. 8B, are diagrams illustrating sequential steps of the process of peeling the outer bag film 60.

As shown in FIG. 8A and FIG. 8B, a heat-sealed portion 100 and a non-heat-sealed portion 101 adjoin each other in a boundary line 102. In the heat-sealed portion 100, the opposed front and rear surfaces of the water-soluble film 6 is fused to each other. On the upper side in the bearings of FIG. 8A, the laminated film on the front side and the laminated film on the rear side do not continue into each other. In other words, the upper side in the bearings of FIG. 8A does not constitute itself a folding line of the laminated film. The point A which is one end of the boundary line 102 reaches the upper side. In the embodiment shown in FIG. 8A–FIG. 8D, the length of the upper side of the heat-sealed portion 100, namely the width of the portion extending along the boundary line 102 in the heat-sealed portion 100 (the length of the upper side of the heat-sealed portion 100 in FIG. 8A) is relatively wide.

From the laminated film which is supposed as shown in FIG. 8A and FIG. 8B, the outer bag film 60 can be easily peeled in a manner as shown in FIG. 8C and FIG. 8D. To be specific, when the front side and the rear side of the laminated film in the non-heat-sealed portion 101 are turned up so as to exert force on the point A, first the outer bag film 60 becomes the state shown in FIG. 8C immediately before starting the peeling and subsequently the portion of the point A of the water-soluble film 6 is moved toward the foreground side (the lower side in the bearings of FIG. 8D) as shown in FIG. 8D, whereas the portions of the front and the rear laminated film in the neighborhood of the boundary line 102 of the outer bag film 60 are gradually turned up outwardly. This is because the water-soluble film 6 possesses expansibility and contractility and the doubled parts of the water-soluble film 6 of the front and the rear laminated film in the heat-sealed portion 100 bordering on the boundary line 102 are fused to each other. As a result, as shown in FIG. 8D, a gap 103 originates in the neighborhood of the point A and develops gradually between the water-soluble film 6 and the outer bag film 60. By utilizing this gap 103 as a beginning for peeling the outer bag film 60, therefore, the outer bag film 60 can be easily peeled.

In the package using the bag shown in FIG. 4, the peeling of the outer bag film 60 is initiated by excising the upper side portion of the perforations 310 along the perforations 310. As a result, the remaining heat-sealed portion 301 corresponds to the heat-sealed portion 100 in FIG. 8A, the point B corresponds to the point B in FIG. 8A, and the remaining heat-sealed portion 309 corresponds to the heat-sealed portion 101 in FIG. 8A. The outer bag film 60, therefore, can be as easily peeled as in the case of FIG. 8A. In the bag shown in FIG. 4, there is no possibility that the water-soluble film 6 of the non-heat-sealed portion 309 is degenerated by the ambient condition because the non-heat-sealed portion 309 is enclosed with the heat-sealed portions 301, 305 and 306 and the non-heat-sealed portion 309 is not opened into the ambience except for the portion of the perforations 310.

While there have been shown and described present preferred embodiments of the invention, it is to be distinctly understood that the invention is not limited thereto but may be otherwise variously embodied and practiced within the scope of the claims.

As described above, the present invention can provide a laminated film capable of producing by the use of existing facilities a bag having a double-wall structure essentially consisting of an outer bag and an inner bag made of a water-soluble film excelling in the peeling property of the outer bag, and capable of setting the state of adhesion based on the week adhesion between the intermediate layer and the water-soluble film at the heat-sealed portions of the bag to prescribed state; a method for producing the laminated film; and a bag and a package both using the laminated film.

What is claimed is:

1. A laminated film comprising:
    an outer-layer-film including one or more layers;
    a water-soluble film; and
    an intermediate layer interposed between said outer-layer-film and said water-soluble film, said intermediate layer containing high-pressure polyethylene oxidized at least on a surface thereof contiguous to said water-soluble film to such a degree that said intermediate layer and said water-soluble film adhere so weakly to each other as to be peelable;
    wherein said outer-layer-film and said intermediate layer adhere fast to each other;
    said intermediate layer and said water-soluble film directly contact each other and adhere so weakly to each other as to be peelable; and
    said water-soluble film includes a water-soluble substrative film and a water-soluble anchor coating agent distributed on a surface of said water-soluble substrative film contiguous to said intermediate layer.

2. A laminated film according to claim 1, wherein said water-soluble substrative film comprises at least one material selected from the group consisting of polyvinyl alcohol, vinyl acetate, vinyl acetate type resin, polyacrylamide, polyethylene oxide, and polyvinylpyrrolidone.

3. A laminated film according to claim 1, wherein said water-soluble anchor coating agent contains polyethyleneimine.

4. A laminated film according to claim 1, wherein said intermediate layer wholly adheres to said water-soluble film so weakly to each other as to be peelable.

5. A laminated film according to claim 1, wherein said intermediate layer includes a layer being contiguous to said water-soluble film and formed by extrusion lamination.

6. A laminated film according to claim 1, wherein said intermediate layer includes a layer formed by cooling a melt extruded so as to be contiguous to said water-soluble film.

7. A laminated film according to claim 1, wherein said intermediate layer containing high-pressure polyethylene is oxidized at least on a surface thereof contiguous to said water-soluble film by thermal oxidation and/or forced oxidation.

8. A bag made of at least one laminated film set forth in claim 1, said at least one laminated film being formed in the shape of a bag opened on one side thereof;
    wherein said at least one laminated film is superposed so that said water-soluble film is positioned inside; and prescribed portions of the superposed laminated film are heat-sealed so that the parts of said water-soluble film facing to each other at the prescribed portions are fused to each other.

9. A package comprising:

a hermetically sealed bag made of at least one laminated film set forth in claim 1; and a prescribed commodity placed in said bag;

wherein said at least one laminated film is superposed so that said water-soluble film is positioned inside; and prescribed portions of the superposed laminated film are heat-sealed so that the parts of said water-soluble film facing to each other at the prescribed portions are fused to each other.

10. A package according to claim 9, wherein said commodity is agricultural chemicals, medicament, food, or ground bait.

11. A method of forming a laminated film comprising:

forming an outer-layer-film including one or more layers;

forming a water-soluble film; and forming an intermediate layer interposed between said outer-layer-film and said water-soluble film, said intermediate layer containing high-pressure polyethylene oxidized at least on a surface thereof contiguous to said water-soluble film to such a degree that said intermediate layer and said water-soluble film adhere so weakly to each other as to be peelable;

wherein said outer-layer-film and said intermediate layer adhere fast to each other;

said intermediate layer and said water-soluble film directly contact each other and adhere so weakly to each other as to be peelable; and said water-soluble film includes a water-soluble substrative film and a water-soluble anchor coating agent distributed on a surface of said water-soluble substrative film contiguous to said intermediate layer.

12. The method for producing a laminated film according to claim 11, wherein the step of forming the intermediate layer comprises a step of extruding a melted and thermally oxidized high-pressure polyethylene in the form of a film between the outer-layer-film including one or more layers and the water-soluble substrative film, wherein the step of forming the water-soluble anchor coating agent comprises forming the water-soluble anchor coating agent in advance on a surface of said water-soluble substrative film contiguous to said outer-layer-film, the method further comprising:

a step of compressing and meanwhile cooling said outer-layer-film, said water-soluble substrative film on which said water-soluble anchor coating agent is applied in advance, and said film of high-pressure polyethylene.

13. The method for producing a laminated film according to claim 11, wherein the step of forming the intermediate layer comprises a step of extruding a melted and thermally oxidized high-pressure polyethylene in the form of a film between a high-pressure polyethylene layer and the water-soluble substrative film, said high-pressure polyethylene layer being formed in advance at least on one surface of the outer-layer-film including one or more layers, the step of forming the water-soluble anchor coating agent comprises forming the water-soluble anchor coating agent in advance on a surface of said water-soluble substrative film contiguous to said outer-layer-film, the method further comprising:

a step of compressing and meanwhile cooling said outer-layer-film on which said high-pressure polyethylene layer is formed in advance, said water-soluble substrative film on which said water-soluble anchor coating agent is applied in advance, and said film of high-pressure polyethylene.

* * * * *